United States Patent
Simpson et al.

(10) Patent No.: US 11,168,721 B2
(45) Date of Patent: Nov. 9, 2021

(54) TAPERED LEAD-IN FOR INTERFERENCE FIT FASTENERS

(71) Applicant: The Boeing Company, Chicago, IL (US)

(72) Inventors: Blake A. Simpson, Kent, WA (US); Tanni Sisco, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/902,378

(22) Filed: Jun. 16, 2020

(65) Prior Publication Data

US 2020/0309173 A1     Oct. 1, 2020

Related U.S. Application Data

(62) Division of application No. 15/437,234, filed on Feb. 20, 2017, now Pat. No. 10,711,814.

(51) Int. Cl.
*F16B 5/02*     (2006.01)
*F16B 5/01*     (2006.01)
(Continued)

(52) U.S. Cl.
CPC ............... *F16B 5/02* (2013.01); *F16B 4/004* (2013.01); *F16B 5/01* (2013.01); *F16B 19/05* (2013.01);
(Continued)

(58) Field of Classification Search
CPC .. F16B 5/02; F16B 5/01; F16B 35/041; F16B 19/05; F16B 4/004; F16B 33/02; F16B 33/06; F16B 41/002; F16B 37/00
See application file for complete search history.

(56) References Cited

U.S. PATENT DOCUMENTS 6,149,363 A * 11/2000 March ..................... B21H 3/06
                                                        411/366.1
7,695,226 B2 * 4/2010 March ................... F16B 35/041
                                                        411/43
(Continued)

FOREIGN PATENT DOCUMENTS

CN        1398325 A       2/2003
CN      101153623 A       4/2008
(Continued)

OTHER PUBLICATIONS

Canadian Office Action dated Apr. 6, 2021 in Canadian Patent Application No. 2,988,522 (Canadian counterpart to the parent of the instant divisional patent application).
(Continued)

*Primary Examiner* — Bayan Salone
(74) *Attorney, Agent, or Firm* — Ostrager Chong Flaherty & Broitman P.C.

(57) ABSTRACT

An assembly comprising first and second structural elements having aligned holes, a fastener that occupies at least respective portions of the holes without a surrounding sleeve, and a mating part that is coupled to the fastener. The fastener comprises: a head; a circular cylindrical shank extending from the head; a mating portion comprising external projections; and a transition portion disposed between the shank and the mating portion. The transition portion comprises a tapered lead-in section that meets the shank at a shank/lead-in intersection and a radiused lead-in section that meets the tapered lead-in section. The tapered lead-in section tapers gradually in a first axial direction toward the mating portion and has a first profile that is linear and a taper angle equal to or less than 20 degrees, while the radiused lead-in section curves abruptly in the first axial direction and has a second profile that is a circular arc having a radius.

20 Claims, 5 Drawing Sheets

(51) Int. Cl.
  *F16B 4/00*    (2006.01)
  *F16B 41/00*   (2006.01)
  *F16B 19/05*   (2006.01)
  *F16B 33/02*   (2006.01)
  *F16B 33/06*   (2006.01)
  *F16B 35/04*   (2006.01)
  *F16B 37/00*   (2006.01)

(52) U.S. Cl.
  CPC ............ *F16B 33/02* (2013.01); *F16B 35/041* (2013.01); *F16B 37/00* (2013.01); *F16B 41/002* (2013.01)

(56) References Cited

U.S. PATENT DOCUMENTS

| | | | |
|---|---|---|---|
| 10,544,815 B2 * | 1/2020 | Bourges | C10M 125/26 |
| 10,641,307 B2 * | 5/2020 | Simpson | F16B 35/041 |
| 10,711,814 B2 * | 7/2020 | Simpson | F16B 37/00 |
| 2008/0075555 A1 * | 3/2008 | March | F16B 35/048 411/361 |
| 2009/0178262 A1 | 7/2009 | Reid et al. | |
| 2017/0298970 A1 * | 10/2017 | Bourges | F16B 4/004 |
| 2018/0238361 A1 * | 8/2018 | Simpson | F16B 41/002 |

FOREIGN PATENT DOCUMENTS

| | | | | |
|---|---|---|---|---|
| FR | 3026446 A1 | 4/2016 | | |
| JP | 2004504944 A | 2/2004 | | |
| JP | 200875876 A | 4/2008 | | |
| JP | 2008518164 A | 5/2008 | | |
| WO | 0026546 A1 | 5/2000 | | |
| WO | 2006043863 A1 | 4/2006 | | |
| WO | 2016050791 A1 | 4/2016 | | |
| WO | WO-2016050791 A1 * | 4/2016 | ............... | C09D 5/00 |

OTHER PUBLICATIONS

Chinese Office Action dated Aug. 26, 2020 in Chinese Patent Application No. 201711345501.3 (Chinese counterpart of the parent of the instant divisional patent application).

Chinese Office Action dated Mar. 25, 2021 in Chinese Patent Application No. 201711345501.3 (Chinese counterpart to the parent of the instant divisional patent application).

Japanese Office Action dated Aug. 23, 2021 in Japanese Patent Application No. 2017-223418 (Japanese counterpart to the parent of the instant divisional patent application).

* cited by examiner

TAPERED LEAD-IN FOR INTERFERENCE FIT FASTENERS

RELATED PATENT APPLICATION

This application is a divisional of and claims priority from U.S. patent application Ser. No. 15/437,234 filed on Feb. 20, 2017, which issued as U.S. Pat. No. 10,711,814 on Jul. 14, 2020.

BACKGROUND

This disclosure generally relates to the use of fasteners to secure two or more structures or workpieces (at least one of which is made of composite material, such as fiber-reinforced plastic) in a manner such that high interference fit of the fasteners within their respective holes in the layers is achieved. In particular, this disclosure relates to interference fit fastener assemblies comprising a bolt or a pin and a mating part (e.g., a nut or a collar) and not including a sleeve surrounding the fastener.

Normal practice for fastening multiple layers of material together is to clamp up the layers, drill holes, and then insert some type of fastener into the holes and thereby secure the layers together. The fasteners are usually inserted in a net or clearance fit in the receiving holes in the layers. For many applications this will be sufficient. However, when the assembled structure is subjected to cyclic loading, the looseness of the fit of the fasteners within their holes will result in continual working of the fasteners within their holes. This in turn may lead to fretting and fatigue issues with either the fastener or the surrounding region of the layers adjacent a particular hole.

To solve the foregoing problems, it is known that the utilization of a high interference fit of the fastener in the hole can effectively prevent the majority of this fretting due to cyclic loading of the assembled structure. High interference creates a tighter joint that reduces movement, resulting in enhanced fatigue performance. In many cases an oversized fastener will be driven directly into the receiving hole in the layers. Typically, some lubricant is applied to the fastener and hole before assembly to reduce the tendency toward abrasion as the fastener is pushed into the hole. In other cases a sleeve is slipped into the hole in a net or clearance fit followed by the drive-in of an oversized fastener with or without lubricant to radially expand the sleeve in order to create an interference fit condition.

Currently there are two primary solutions for fasteners used in the assembly of composite wing structures in aircraft production: (1) sleeved bolt systems; and (2) clearance fit fasteners with cap seals. The use of sleeved bolt systems has the following drawbacks: (a) the parts require complicated installation methods; (b) the parts require careful handling to prevent damage; and (c) the system requires extensive in-process measurements (resulting in longer assembly time). The use of clearance fit fasteners with cap seals has the following drawbacks: (a) this system allows for increased joint deflection over time, affecting fatigue performance; and (b) the amount of time involved in seal cap application increases assembly time. In addition, existing interference fit solutions used in metallic aircraft structure may not be optimized to reduce the installation force load when a fastener is installed. A high installation force load may cause composite material to crack or excessively delaminate.

It would be desirable to provide improved interference fit fasteners for installation in composite material which reduce installation force loads and address one or more of the drawbacks identified in the preceding paragraph.

SUMMARY

The subject matter disclosed in detail below is directed to interference fit fasteners for attaching two or more structures together. Each interference fit fastener comprises a fastener having external projections that has a tapered lead-in section between the shank and the mating portion. In the embodiments disclosed in detail below, the taper is linear, meaning that the external surface of the tapered lead-in section will be a section of a right circular cone. This linearly tapered lead-in geometry decreases installation forces in interference fit holes, thereby increasing joint fatigue life, enhancing fluid tightness, and reducing susceptibility to electromagnetic effects. A linearly tapered lead-in geometry accomplishes the foregoing by promoting gradual compression of material as the bolt is pushed through the structures to be fastened.

In accordance with at least some embodiments, the interference fit fastener comprises a fastener having a transition portion disposed between a shank and a mating portion having external projections, which transition portion comprises a tapered lead-in section that meets the shank at a shank/lead-in intersection and a radiused tapered lead-in section that meets the tapered lead-in section. The tapered lead-in section tapers gradually in a first axial direction toward the mating portion and has a first profile that is linear and a taper angle equal to or less than 20 degrees, and the radiused lead-in section curves abruptly in the first axial direction and has a second profile that is a circular arc having a radius.

As used herein, the term "external projections" should be construed broadly to encompass at least the following types: (1) external threads and (2) external annular rings. For the purpose of illustration, examples of fasteners having externals threads are described below. However, the concepts disclosed and claimed herein also have application to interference fit fasteners having external annular rings. Thus the subject matter disclosed in detail below may be characterized by one or more of the following aspects.

One aspect of the subject matter disclosed in detail below is a method for fastening a first structure having a first hole and a second structure having a second hole, the first and second holes having the same diameter, comprising: placing the first and second structures together with the first and second holes aligned; inserting a mating portion of a fastener into the hole in the first structure until an edge of the hole in the first structure is in contact with and surrounds a tapered lead-in section of the fastener that tapers gradually toward the mating portion and has a taper angle equal to or less than 20 degrees, the fastener further comprising a head and a circular cylindrical shank connecting the head to the tapered lead-in section, the shank having a diameter greater than the diameter of the holes; and forcing the fastener further into the aligned first and second holes to cause the shank to contact the edge of the first hole, push through the first hole, and then push through the second hole until the mating portion of the fastener projects beyond the second structure; and coupling a mating part to the mating portion of the fastener. In accordance with one embodiment, an external surface of the tapered lead-in section is a section of a right circular cone, a maximum diameter of the tapered lead-in section equals the diameter of the shank and a minimum diameter of the tapered lead-in section is less than the diameter of the first and second holes. In accordance with one embodiment, the fastener further comprises a radiused lead-in section that meets the tapered lead-in section, curves abruptly toward the mating portion and has a second profile that is a circular arc having a radius, wherein the mating portion has a maximum diameter less than a minimum diameter of the radiused lead-in section.

Another aspect of the subject matter disclosed herein is a method for fastening a first structure having a first hole and a second structure having a second hole, the first and second holes having the same hole diameter, comprising: placing the first and second structures together with the first and second holes aligned; inserting a mating portion of a fastener into the first hole until an edge of the first hole in the first structure is in contact with and surrounds a tapered lead-in section of the fastener that tapers gradually toward the mating portion, the fastener further comprising a head and a circular cylindrical shank connecting the head to the tapered lead-in section, the shank having a shank diameter greater than the hole diameter, and the amount of interference between the shank and the first hole being no more than 0.004 inch; forcing the fastener further into the aligned holes of the first and second structures to cause the shank to contact the edge of the first hole, push through the first hole, and then push through the second hole until the mating portion of the fastener projects beyond the second structure; and coupling a mating part to the mating portion of the fastener.

A further aspect of the subject matter disclosed herein is a fastener assembly comprising a fastener and a mating part coupled to the fastener, wherein the fastener comprises: a head; a shank extending from the head, the shank comprising an external surface that is circular cylindrical and has a shank diameter in a range of $\frac{6}{32}$ to $\frac{16}{32}$ inch; a mating portion comprising external projections; and a transition portion disposed between the shank and the mating portion, wherein the transition portion comprises a tapered lead-in section that meets the shank at a shank/lead-in intersection and a radiused lead-in section that meets the tapered lead-in section. As in the first aspect, the tapered lead-in section tapers gradually in a first axial direction toward the mating portion and has a first profile that is linear, a taper length in a range of 0.062 to 0.092 inch, and a taper angle equal to or less than 20 degrees, and the radiused lead-in section curves abruptly in the first axial direction and has a second profile that is a circular arc having a radius.

In accordance with some embodiments, the fastener comprises a bolt and the mating part comprises a nut having internal threads that are interengaged with the external projections of the mating portion of the bolt. In accordance with other embodiments, the fastener comprises a pin and the mating part comprises a collar that is interengaged with the external projections of the mating portion of the pin.

Yet another aspect of the subject matter disclosed herein is an assembly comprising a first structural element having a first hole, a second structural element having a second hole aligned with the first hole of the first structural element, a fastener that occupies at least respective portions of the holes in the first and second structural elements without a surrounding sleeve and extends beyond the second structural element, and a mating part that abuts the second structural element and is coupled to the fastener, wherein the fastener comprises: a head; a shank extending from the head, the shank comprising an external surface that is circular cylindrical; a mating portion comprising external projections; and a transition portion disposed between the shank and the mating portion, wherein the transition portion comprises a tapered lead-in section that meets the shank at a shank/lead-in intersection and a radiused lead-in section that meets the tapered lead-in section. The tapered lead-in section tapers gradually in a first axial direction toward the mating portion and has a first profile that is linear and a taper angle equal to or less than 20 degrees, and the radiused lead-in section curves abruptly in the first axial direction and has a second profile that is a circular arc having a radius. In accordance with some embodiments, one of the first and second structural elements is made of composite material and the other of the first and second structural elements is made of metallic material. In accordance with other embodiments, both structural elements are made of composite material. The fastener and the first and second structural elements are in contact without a sleeve therebetween.

Other aspects of improved interference fit fasteners for attaching two or more structures to each other are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Various embodiments of an interference fit fastener will now be described in detail for the purpose of illustration. At least some of the details disclosed below relate to optional features or aspects, which in some applications may be omitted without departing from the scope of the claims appended hereto.

In particular, illustrative embodiments of an interference fit fastener for attaching two structures to each other are described in some detail below. In the examples given below, one of the structures is made of metallic material (e.g., a metal alloy) and the other structure is made of composite material (e.g., fiber-reinforced plastic). However, in alternative examples, both structures can be made of composite material or both structures can be made of metallic material. In addition, it should be appreciated that the concept disclosed herein also has application in the attachment of three or more structures together.

Figure 1:
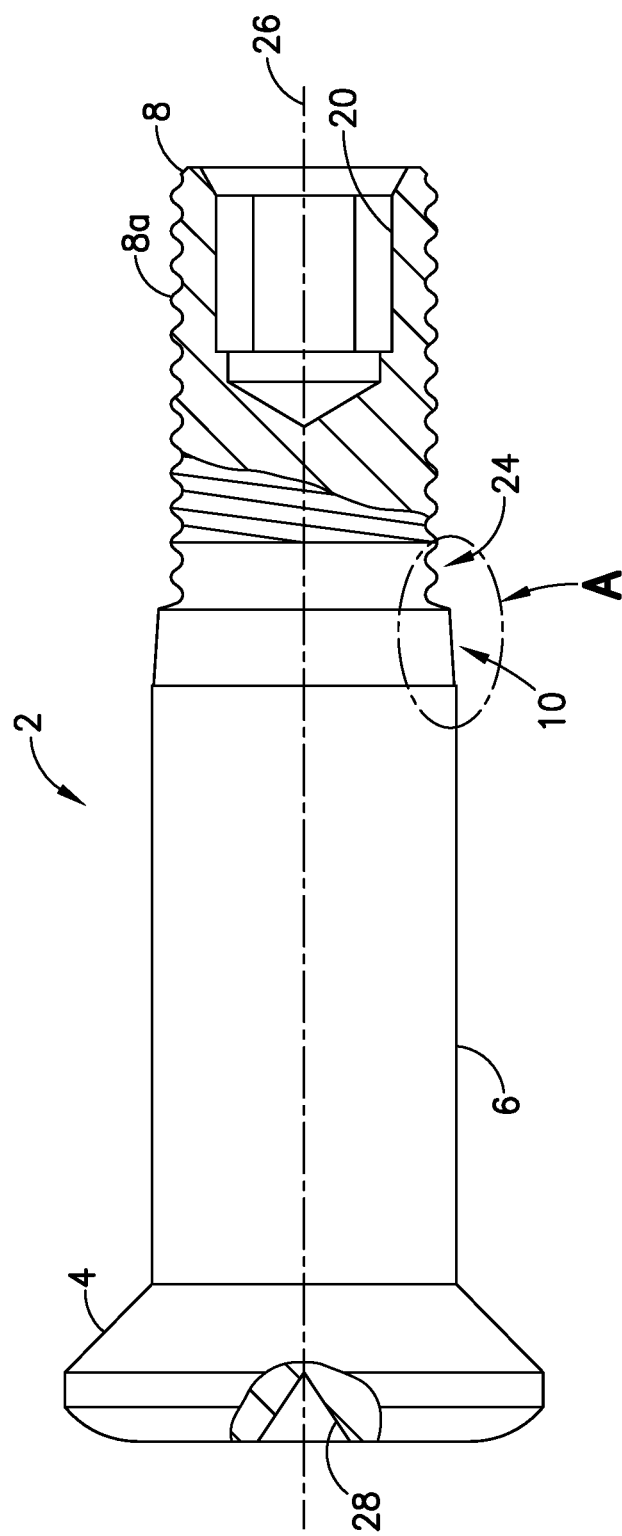
FIG. 1 is a diagram representing a partially sectioned view of an interference fit bolt.

FIG. 1 is a diagram representing a partially sectioned view of an interference fit bolt 2 (hereinafter "bolt 2"). The bolt 2 comprises a head 4 designed to be countersunk into the structure and a shank 6 extending from the head 4. The head 4 has a drill center dimple 28. The shank 6 comprises an external surface that is circular cylindrical. The bolt 2 further comprises a threaded portion 8 comprising external threads 8a which is connected to the shank 6 by a transition portion 10 disposed between the shank 6 and the threaded portion 8. The threaded portion 8 has a hexagonal recess 20, in which an Allen key can be inserted during installation to hold the bolt 2 in place while a mating part is rotated about the external threads 8a.

Figure 2:
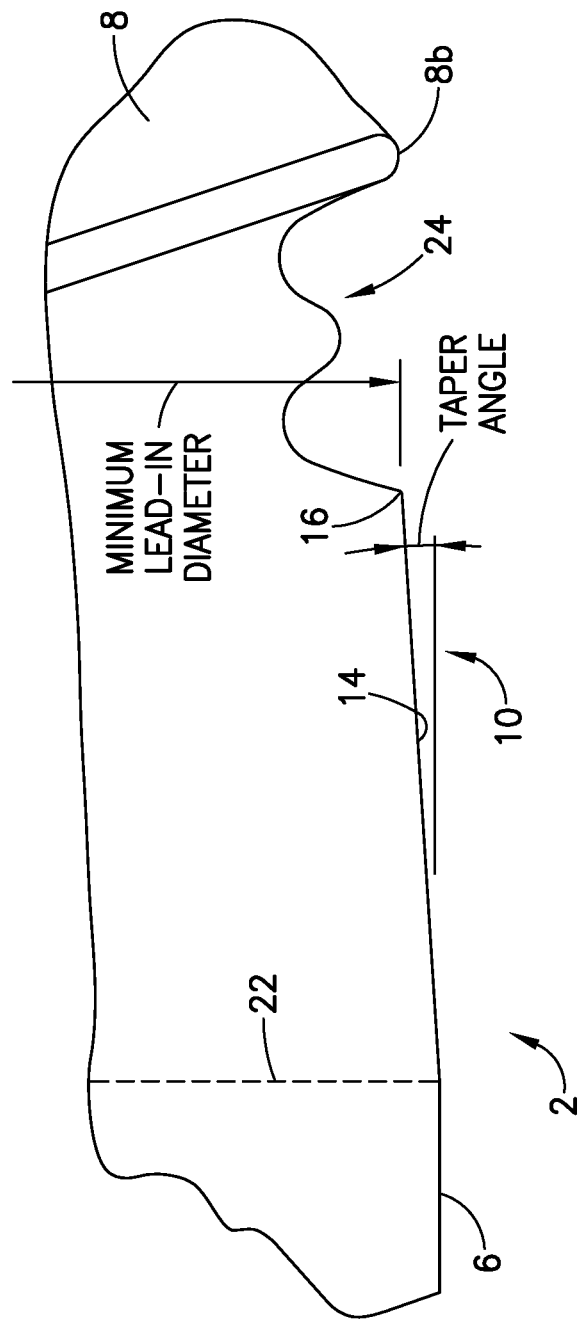
FIG. 2 is a diagram representing a view of the portion of the interference fit bolt within the dashed ellipse A depicted in FIG. 1, which view shows the geometry of a tapered lead-in section in accordance with one embodiment.

FIG. 2 is a diagram representing a view of the portion of the bolt 2 within the dashed ellipse A depicted in FIG. 1. The depicted portion of bolt 2 includes a portion of an incomplete thread 8b, which represents the start of the threaded portion 8. This view shows the geometry of the transition portion 10 in accordance with one embodiment. The transition portion 10 comprises a tapered lead-in section 14 that meets the shank 6 at a shank/lead-in intersection 22 (indicated by a straight vertical dashed line in FIG. 2) and a radiused lead-in section 16 that meets the tapered lead-in section 14. The transition portion 10 further comprises a transition section 24 between the radiused lead-in section 16 and the threaded portion 8. This transition section 24 has an external surface defined by an undulating curve rotated about the central axis 26 of bolt 2 and has diameters which are less than a minimum diameter D of the tapered lead-in section 14. In addition, the threaded portion 8 of bolt 2 has a maximum diameter which is less than the minimum diameter D.

The tapered lead-in section 14 tapers gradually in a first axial direction toward the threaded portion 8 and has a first profile that is a circular arc having a first radius. The radiused tapered lead-in section 16 curves abruptly in the first axial direction and has a second profile that is a circular arc having a second radius which is smaller than the first radius.

For the avoidance of doubt, the first and second profiles of the transition portion 10 are defined as follows. The first profile is a profile of an external surface of the tapered lead-in section 14 in a plane that intersects a central axis 26 of bolt 2. The second profile is an external surface of the radiused lead-in section 16 in the plane that intersects the central axis 26. In accordance with one embodiment, the profile of the shank 6 in the plane that intersects the central axis 26 is tangent to the first profile of the transition portion 10. The linearly tapered lead-in geometry of the tapered lead-in section 14 promotes gradual compression of material as the bolt 2 is pushed through the structures to be fastened.

It should be appreciated that the dimensions of bolt 2 will vary depending on the thicknesses of the structures being fastened together and the diameters of the aligned holes in those structures. In accordance with various examples, the taper length of the tapered lead-in section 14 may be in a range of 0.062 to 0.092 inch for bolts or pins having a shank diameter in a range of 6/32 to 16/32 inch, the taper angle of the tapered lead-in section 14 may be 20 degrees or less, and the radius r of the radiused tapered lead-in section 16 may be about 0.01 inch.

An externally threaded fastener such as bolt 2 can be used to fasten a first structure having a first hole and a second structure having a second hole, the first and second holes having the same diameter. In accordance with one embodiment, the method comprises the following steps: placing the first and second structures together with the first and second holes aligned; inserting a threaded portion 8 of bolt 2 into the hole in the first structure until an edge of the hole in the first structure is in contact with and surrounds the tapered lead-in section 14; and forcing the bolt 2 further into the aligned holes of the first and second structures to cause the shank 6 to contact the edge of the hole in the first structure, push through the hole in the first structure, and then push through the hole in the second structure until the threaded portion 8 of bolt 2 projects beyond the second structure; and coupling a mating part to the threaded portion 8 of bolt 2. As previously described, the tapered lead-in section 14 tapers gradually toward the threaded portion 8 and has a taper angle equal to or less than 20 degrees, while the shank 6 is circular cylindrical and has a diameter greater than the diameter of the first and second holes. In accordance with one embodiment, an external surface of the tapered lead-in section 14 is a section of a right circular cone, a maximum diameter of the tapered lead-in section 14 equals the diameter of the shank 6 and a minimum diameter of the tapered lead-in section 16 is less than the diameters of the first and second holes.

Figure 3:
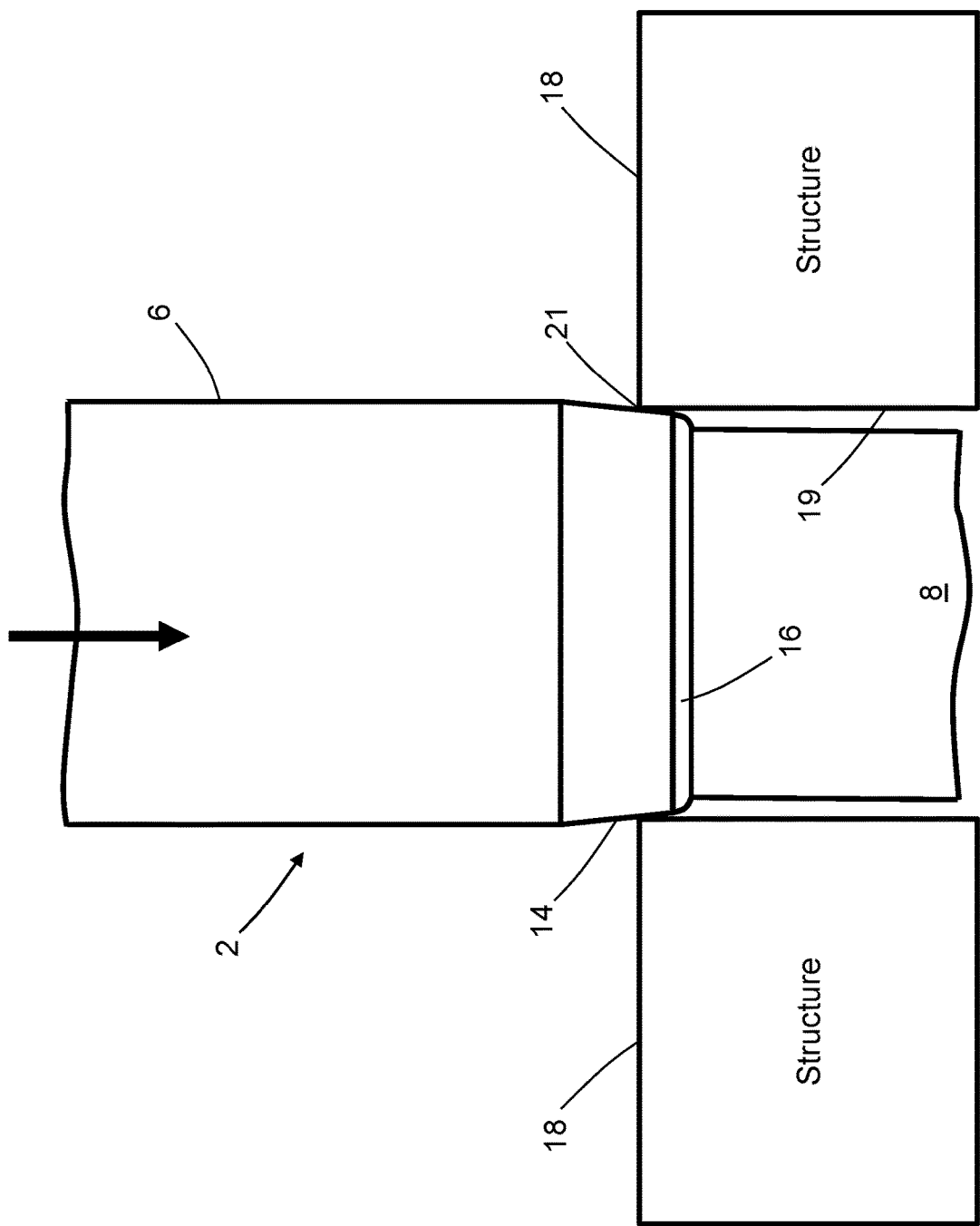
FIG. 3 is a diagram showing a sectional view of a portion of an interference fit bolt being pushed into an interference hole of a structure.

During installation, a manual rivet gun or automated system can be used to hammer the bolt 2 into aligned holes of the structures to be fastened. FIG. 3 shows a portion of a bolt 2 being pushed into an interference hole 19 of a structure 18. The bolt 2 comprises a circular cylindrical shank 6 having a diameter greater than the diameter of the hole 19 in the structure 18 (one-half of the difference between the shank diameter and the hole diameter will be referred to below as the "amount of interference"), a tapered lead-in section 14, a radiused lead-in section 16 and a threaded portion 8 (the external threads are not shown in FIG. 3). A maximum diameter of the tapered lead-in section 14 equals the diameter of the shank 6 and a minimum diameter of the tapered lead-in section 14 is less than the diameter of the hole 19 in the structure 18. The hole 19 has an edge 21 which slides along the tapered lead-in section 14 as the bolt 2 is pushed into the interference hole 19. Edge 21 may be radiused. Depending on the amount of interference (preferably not in excess of 0.004 inch) and the taper angle, the edge 21 of hole 19 will slide gradually along the tapered lead-in section 14 for a varying percentage of the taper length during bolt insertion. The gradual tapered angle of the tapered lead-in section 14 reduces the forces by approximately 300-500 lb., thereby reducing any potential damage to the structure 18.

The bolt 2 will be pushed into the aligned interference holes of the structures to be fastened until the threaded portion 8 projects beyond the last structure. A mating part (not shown in FIG. 3) is then placed onto the threaded portion 8 with a specified clamping force. In some cases, the mating part may take the form of a nut having an opening with internal threads and a non-circular wrenching surface (e.g., hexagonal) designed to be engaged by a wrench or similar tool. It should be appreciated, however, that a variety of collars and nuts are compatible with the fasteners disclosed herein. Two examples of suitable collars will be described hereinafter with reference to FIGS. 4 and 5.

Figure 4:
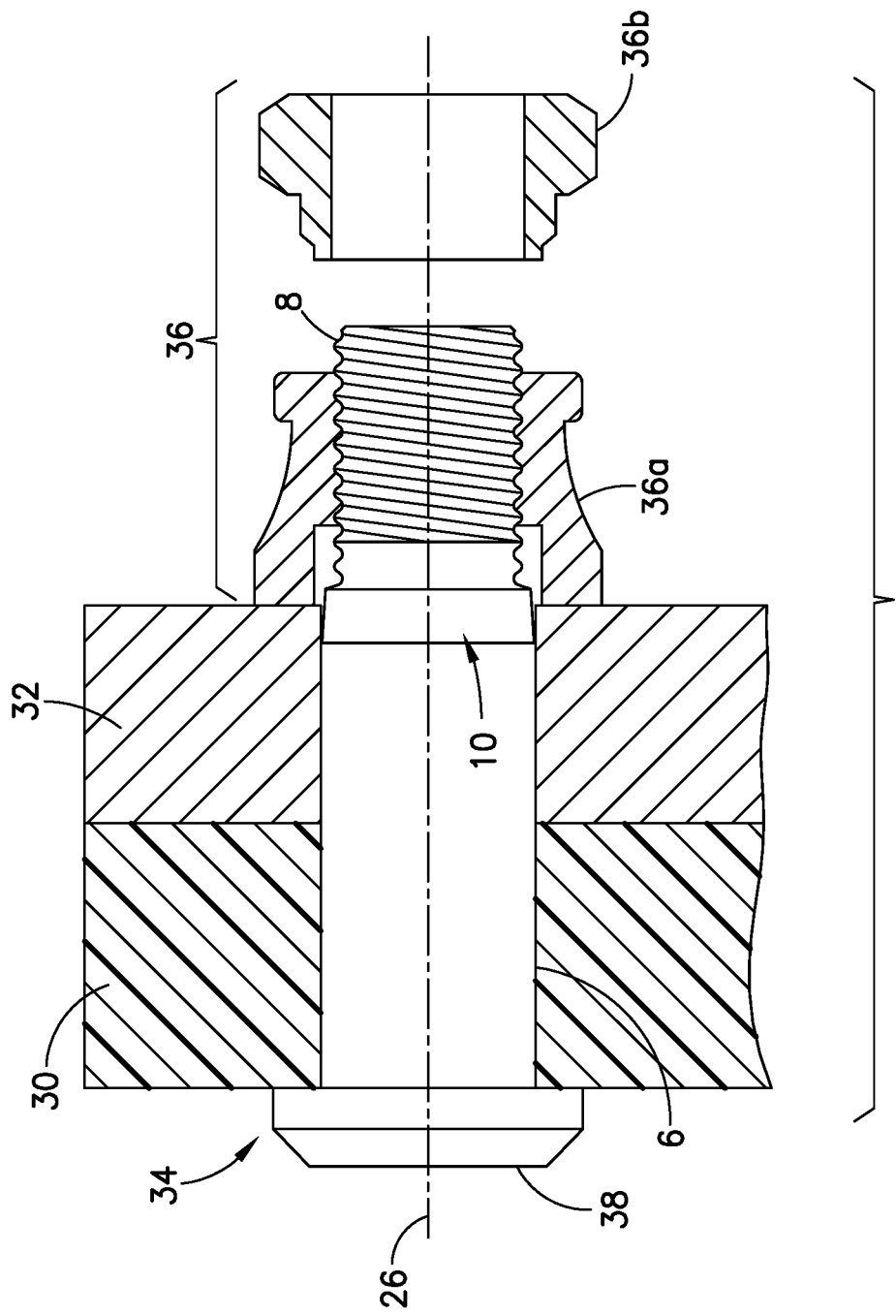
FIG. 4 is a diagram representing a partially sectioned view of an assembly comprising composite and metallic structures gripped by a sleeveless interference fit fastener assembly in accordance with an alternative embodiment, which fastener assembly comprises a pin having external threads and a collar having internal threads interengaged with the external threads.

FIG. 4 is a diagram representing a partially sectioned view of an assembly comprising a composite structure 30 and a metallic structure 32 gripped by a sleeveless interference fit fastener assembly in accordance with an alternative embodiment. The fastener assembly comprises an interference fit pin 34 (hereinafter "pin 34") having external threads and a remaining collar portion 36a having internal threads interengaged with the external threads of pin 34. FIG. 4 also shows a collar wrenching element 36b which, prior to separation from remaining collar portion 36a, was connected to remaining collar portion 36a. The collar wrenching element 36b has a non-circular wrenching surface (e.g., hexagonal) designed to be engaged by a wrench or similar tool, whereas the remaining collar portion 36a does not have a wrenching surface, thereby reducing the weight of the collar as compared to the weight of a nut. For example, the external profile of the remaining collar portion 36a may be circular. This initial joinder of remaining collar portion 36a and collar wrenching element 36b (i.e., prior to the wrenching operation) to form a collar 36 indicated by the upper curly bracket in FIG. 4.

Although not shown in detail, the pin 34 depicted in FIG. 4 comprises a shank 6, threaded portion 8 and transition portion 10 similar to the corresponding structures in bolt 2 seen in FIG. 1. More specifically, the transition portion 10 comprises a tapered lead-in section 14 and a radiused lead-in section 16 having the geometry shown in FIG. 2 and the dimensions set forth above. Although FIG. 4 depicts a pin 34 having a protruding head 38, pin 34 may in the alternative have a countersunk (i.e., flush) head.

The procedure for installing fastener assemblies of the type depicted in FIG. 4 is well known. Such a fastener assembly can be installed by one person from one side of the structures being fastened using power tools or hand tools. The procedure does not require calibrated torque wrenches and torque inspection. The collar 36 is screwed onto the threaded portion 8 of pin 34 and then tightened until a specified preload is produced on each fastener. The collar wrenching element 36b will break away at the designed preload, leaving the remaining collar portion 36a as seen in FIG. 4. The elimination of the collar wrenching element 36b at torque-off results in weight savings of the fastener assembly. The fastener assembly can also be installed using a robotic system to insert and hammer the pin into the structure, and another robot or human tightens the collar from the other side of the structure.

Figure 5:
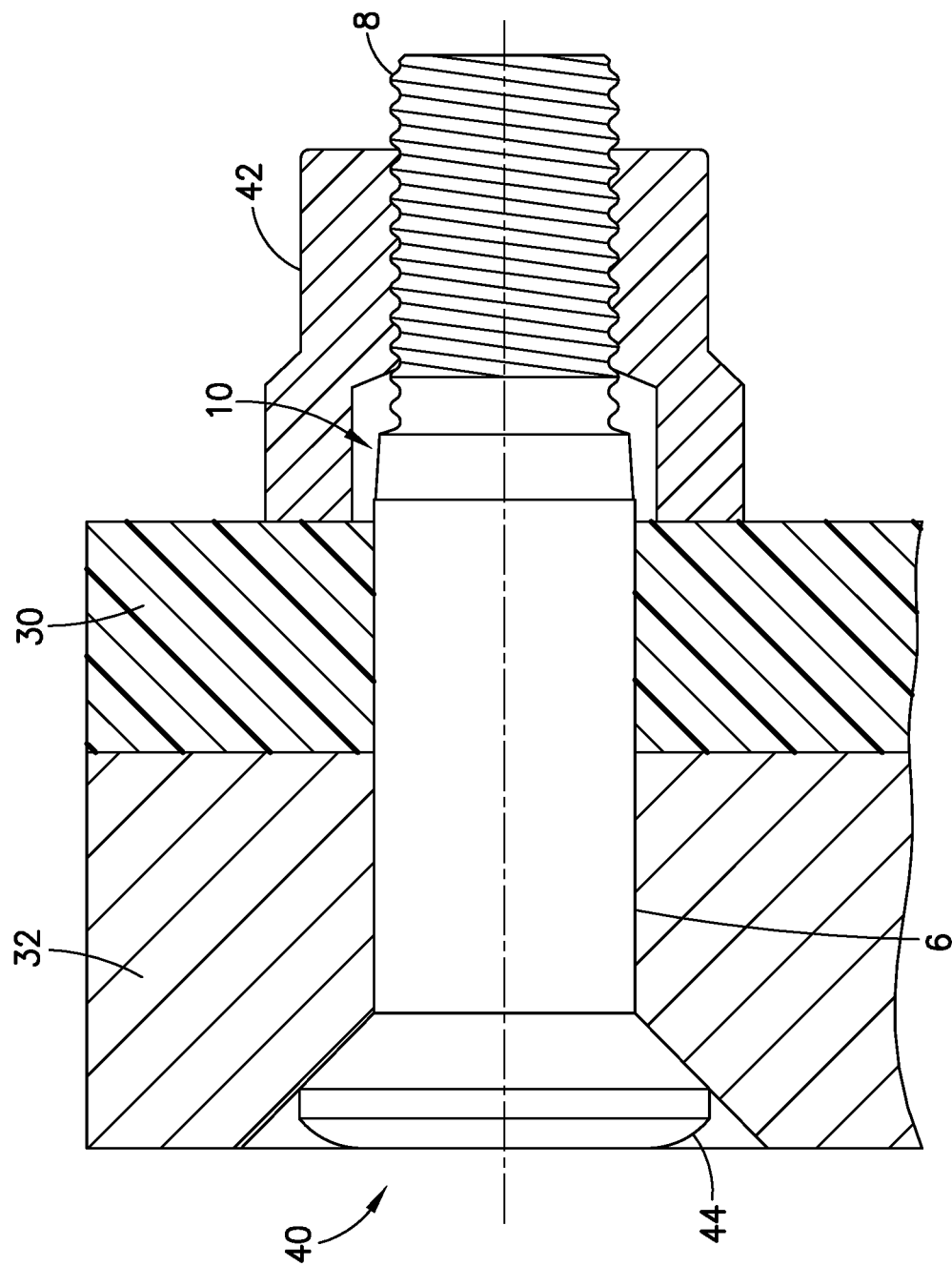
FIG. 5 is a diagram representing a partially sectioned view of an assembly comprising composite and metallic structures gripped by a sleeveless interference fit fastener assembly in accordance with a further embodiment, which fastener assembly comprises a pin having external threads and a swaged collar interengaged with the external threads.

FIG. 5 is a diagram representing a partially sectioned view of an assembly comprising a composite structure 30 and a metallic structure 32 (referred to below as the "joint structure") gripped by a sleeveless interference fit fastener assembly in accordance with a further embodiment. This fastener assembly (which is frequently referred to as a lockbolt) comprises an interference fit pin 40 (hereinafter "pin 40") having external threads and a swaged collar 42 that is interengaged with the external threads of pin 40. In alternative embodiments, the pin 40 may have external annular rings instead of external threads.

Although not shown in detail, the pin 40 depicted in FIG. 5 comprises a shank 6, a threaded portion 8 and a transition portion 10 similar to the corresponding structures in bolt 2 seen in FIG. 1. More specifically, the transition portion 10 comprises a tapered lead-in section 14 and a radiused lead-in section 16 having the geometry shown in FIG. 2 and the dimensions stated above. Although FIG. 5 depicts a pin 40 having a countersunk (i.e., flush) head 44, pin 40 may in the alternative have a protruding head.

The pin 40 shown in FIG. 5 is inserted into one side of the joint structure and the unswaged collar (not shown in FIG. 5) is placed over the pin 40 from the other side of the joint structure. Access to both sides of the joint structure is required. During the installation cycle of a lockbolt, the unswaged collar (in the form of a loose-fitting metal ring) is deformed around the pin 40, which has locking grooves on the threaded portion 8. Although not shown in FIG. 5, it is well known that at the start of a typical lockbolt installation procedure, the pin 40 is connected to a pintail. Then a tool is engaged with the pintail. Thereafter the pin head 44 is pulled against the metallic structure 32 and the unswaged collar is pushed against the composite structure 30, pulling the composite structure 30 and metallic structure 32 together. Then a conical cavity of the tool is forced down the collar, which reduces the diameter of collar and progressively swages the collar material into the grooves of the harder pin 40, thereby forming swaged collar 42. As the force required for swaging increases during the process, the installation is completed when the pintail (not shown) breaks off. The pin 40 and swaged collar 42 combine to form the fastener assembly.

The bolts and pins disclosed herein are preferably made of a metal alloy such as titanium alloy, aluminum alloy, Inconel or corrosion-resistant steel. The collars disclosed herein are preferably made of titanium alloy, aluminum alloy or corrosion-resistant steel. The bolts, pins and collars are preferably coated or partially coated. The coating could be any combination of aluminum pigment coating, solid film lubricant, metallic plating (cadmium plate, zinc-nickel, etc.). Each coating could have an additional lubricant such as cetyl alcohol applied over the top.

The interference fit fasteners disclosed herein are especially useful in the assembly of composite wing structures during aircraft production. The proposed system has the following benefits over the existing systems.

The interference fit fasteners disclosed herein have advantages over sleeved bolts in that, by eliminating the sleeve element, the proposed fastener assembly reduces manufacturing complexity and decreases part cost. By installing these bolts or pins in interference, the assembly time is drastically reduced compared to the traditional sleeved bolt assembly process.

The interference fit fasteners disclosed herein have advantages over installing clearance fit fasteners with cap seals in that fatigue results are improved with interference fit fasteners compared to clearance fit fasteners. These fasteners are installed in the most fatigue-critical areas of the aircraft. Currently, the radii of fasteners in the industry are not optimized with the lead-in to promote interference fit in composite material (which may produce high installation forces due to the non-optimal lead-in geometry). The lead-in geometry proposed herein helps preclude fasteners from "sticking" in the hole or causing excessive damage to the structure during installation. Since this system does not need to add cap seals, the assembly time is decreased.

While interference fit fasteners for attaching two structures to each other have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "external projections" should be construed broadly to encompass at least the following types: (1) external threads and (2) external annular rings. As used in the claims, the category "mating parts" comprises internally threaded nuts and collars and swaged collars. As used in the claims, the term "fastener assembly" should be construed broadly to read on at least each of the following: (1) a bolt and a nut coupled to each other; (2) a bolt and a collar coupled to each other; (3) a pin and a collar coupled to each other; and (4) a pin and a nut coupled to each other.

The invention claimed is:

1. An assembly comprising a first structural element having a first hole, a second structural element having a second hole aligned with the first hole of the first structural element, a fastener that occupies at least respective portions of the first and second holes in the first and second structural elements without a surrounding sleeve and extends beyond the second structural element, and a mating part that abuts the second structural element and is coupled to the fastener, wherein the fastener comprises:
a head;
a shank extending from the head, the shank comprising an external surface that is circular cylindrical;
a mating portion comprising external projections; and
a transition portion disposed between the shank and the mating portion,
wherein the transition portion comprises a tapered lead-in section that meets the shank at a shank/lead-in intersection and a radiused lead-in section that meets the tapered lead-in section, the tapered lead-in section tapers gradually in a first axial direction toward the mating portion and has a first profile that is linear and a taper angle equal to or less than 20 degrees, and the radiused lead-in section curves abruptly in the first axial direction and has a second profile that is a circular arc having a radius; and
wherein the mating portion has a maximum diameter less than a minimum diameter of the radiused lead-in section.

2. The assembly as recited in claim 1, wherein the shank of the fastener and the first and second structural elements are in contact without a sleeve therebetween.

3. The assembly as recited in claim 1, wherein one of the first and second structural elements is made of composite material and the other of the first and second structural elements is made of metallic material.

4. The assembly as recited in claim 1, wherein the mating part comprises internal threads that are interengaged with the external projections of the mating portion of the fastener.

5. The assembly as recited in claim 1, wherein the mating part comprises a swaged collar that is interengaged with the external projections of the mating portion of the fastener.

6. The assembly as recited in claim 1, wherein the first profile is a profile of an external surface of the tapered lead-in section in a plane that intersects a central axis of the fastener, and the second profile is an external surface of the radiused lead-in section in the plane that intersects the central axis of the fastener.

7. The assembly as recited in claim 1, wherein a maximum diameter of the tapered lead-in section equals a diameter of the shank and an external surface of the tapered lead-in section is a section of a right circular cone.

8. An assembly comprising:
a first structural element having a first hole;
a second structural element having a second hole aligned with the first hole of the first structural element;
a fastener comprising a head, a shank that extends from the head, a mating portion that extends beyond the second structural element, and a transition portion disposed between the shank and the mating portion, wherein the shank occupies at least respective portions of and contacts the first and second holes in the first and second structural elements, the mating portion comprises external projections, and the transition portion comprises a tapered lead-in section that meets the shank at a shank/lead-in intersection and a radiused lead-in section that meets the tapered lead-in section; and
a mating part that abuts the second structural element and is coupled to the mating portion of the fastener,
wherein the tapered lead-in section tapers gradually in a first axial direction toward the mating portion and has a first profile that is linear and a taper angle equal to or less than 20 degrees; and
wherein the mating portion has a maximum diameter less than a minimum diameter of the radiused lead-in section.

9. The assembly as recited in claim 8, wherein the radiused lead-in section curves abruptly in the first axial direction and has a second profile that is a circular arc having a radius.

10. The assembly as recited in claim 8, wherein the shank of the fastener and the first and second structural elements are in contact without a sleeve therebetween.

11. The assembly as recited in claim 8, wherein one of the first and second structural elements is made of composite material and the other of the first and second structural elements is made of metallic material.

12. The assembly as recited in claim 8, wherein the mating part comprises internal threads that are interengaged with the external projections of the mating portion of the fastener.

13. The assembly as recited in claim 8, wherein the mating part comprises a swaged collar that is interengaged with the external projections of the mating portion of the fastener.

14. The assembly as recited in claim 8, wherein the first profile is a profile of an external surface of the tapered lead-in section in a plane that intersects a central axis of the fastener, and the second profile is an external surface of the radiused lead-in section in the plane that intersects the central axis of the fastener.

15. The assembly as recited in claim 8, wherein a maximum diameter of the tapered lead-in section equals a diameter of the shank and an external surface of the tapered lead-in section is a section of a right circular cone.

16. A fastener comprising a head, a shank that extends from the head, a mating portion, and a transition portion disposed between the shank and the mating portion, wherein the mating portion comprises external projections, and the transition portion comprises a tapered lead-in section that meets the shank at a shank/lead-in intersection and a radiused lead-in section that meets the tapered lead-in section, wherein:
the tapered lead-in section tapers gradually in a first axial direction toward the mating portion and has a first profile that is linear and a taper angle equal to or less than 20 degrees;
the radiused lead-in section curves abruptly in the first axial direction and has a second profile that is a circular arc having a radius; and
the mating portion has a maximum diameter less than a minimum diameter of the radiused lead-in section.

17. The fastener as recited in claim 16, wherein the first profile is a profile of an external surface of the tapered lead-in section in a plane that intersects a central axis of the fastener, and the second profile is an external surface of the radiused lead-in section in the plane that intersects the central axis of the fastener.

18. The fastener as recited in claim 16, wherein a maximum diameter of the tapered lead-in section equals a diameter of the shank and an external surface of the tapered lead-in section is a section of a right circular cone.

19. The fastener as recited in claim 16, wherein the external projections are external threads.

20. The fastener as recited in claim 16, wherein the external projections are external annular rings.

\* \* \* \* \*